Sept. 4, 1951 H. J. HEPP 2,566,613
AROMATIC RECOVERY PROCESS
Filed July 20, 1948
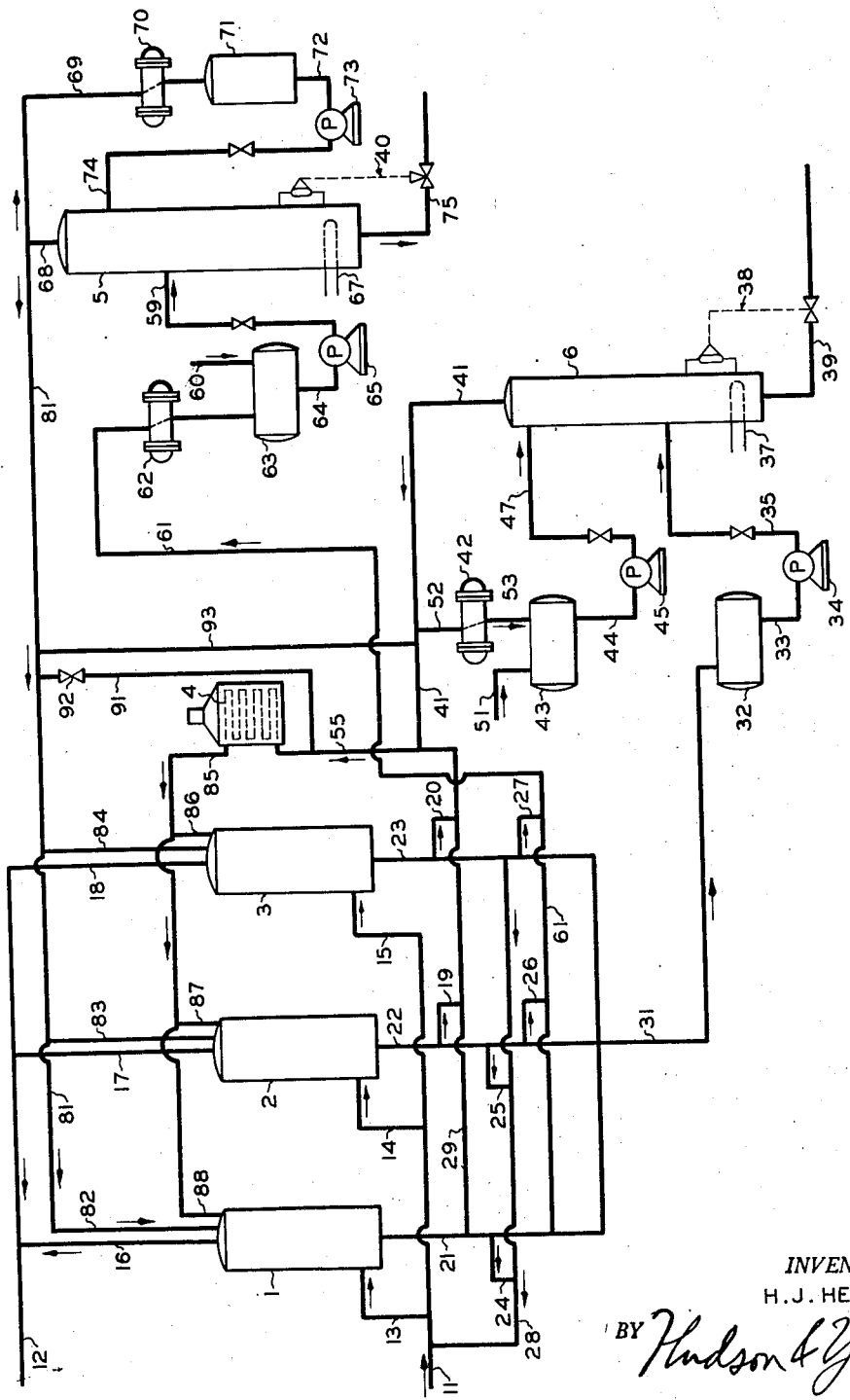
INVENTOR.
H.J. HEPP
BY Hudson & Young
ATTORNEYS

Patented Sept. 4, 1951

2,566,613

UNITED STATES PATENT OFFICE 2,566,613

AROMATIC RECOVERY PROCESS

Harold J. Hepp, Bartlesville, Okla., assignor to Phillips Petroleum Company, a corporation of Delaware Application July 20, 1948, Serial No. 39,690

3 Claims. (Cl. 260—674)

This invention relates to the treatment of hydrocarbons. In one of its more specific aspects it relates to a method for the separation of a hydrocarbon of one type from one or more hydrocarbons of another type contained in a mixture containing two or more types of hydrocarbons. In a still more specific aspect it relates to a method for the separation and recovery of aromatic hydrocarbons from mixtures with hydrocarbons of other types.

Numerous methods for the separation of hydrocarbon types have been proposed, among which might be mentioned acid treating, solvent extraction, fractionation and adsorption. This invention has to do with a specific method for the removal and recovery of aromatic hydrocarbons from mixtures of aromatic, cycloparaffinic and paraffinic hydrocarbons, with the use of solid adsorbents. A specific application of my invention, as will be fully disclosed hereinafter, deals with the separation of benzene from mixtures of benzene and hexane.

An object of my invention is to provide a process for the separation and recovery of aromatic hydrocarbons from hydrocarbon mixtures containing aromatic and other hydrocarbons.

Another object of my invention is to provide a process employing a solid adsorbent, such as silica gel, in a fixed-bed system for the separation and recovery of aromatic hydrocarbons from mixtures with other hydrocarbons.

Still another object of my invention is to provide an economical process for the separation and recovery of aromatic hydrocarbons from mixtures with other hydrocarbons wherein external heating and cooling requirements are reduced to a minimum.

Yet another object of my invention is to provide an economical cyclic process for the separation and recovery of aromatic hydrocarbons from mixtures with other hydrocarbons wherein the external heating and cooling requirements are reduced to a minimum.

Still other objects and advantages will be apparent upon reading the following disclosure taken in conjunction with the drawing which respectively describes and illustrates a preferred embodiment of my invention.

While it is well known to the art that solid adsorbents such as silica gel, active charcoal and the like may be used to separate hydrocarbon mixtures as to type or molecular weight, the commercial development of such processes has been seriously hampered by the difficulty and expense entailed in freeing a chamber, just removed from the adsorption cycle, from hydrocarbon retained in the interspaces between granules of the adsorbent or mechanically or loosely adsorbed in the pores. If such material is not removed prior to desorption, the purity of the recovered product is substantially lowered, and a large quantity of heat is required to vaporize the material. In addition, the large amount of heat required to repeatedly raise a chamber to desorption temperature, and the equally large cooling requirement, has been a serious handicap.

In my process these difficulties have been overcome and a cycle developed which is economical in respect to heating and cooling requirement, and is capable of producing a product of enhanced purity. This is accomplished by flushing the unadsorbed hydrocarbons retained in the interspaces or pores of the adsorbent with a suitable substance easily separated in a subsequent step from the unadsorbed hydrocarbons, which substance is supplied to the top of the chamber as a vapor at a temperature which will partly desorb loosely adsorbed hydrocarbons from the adsorbent, and at such pressure that it will be condensed to a liquid upon contact with the adsorbent. The liquid thus formed will flush the unadsorbed hydrocarbon from the adsorbent, and the heat released by the liquefaction of the flushing fluid will preheat the adsorbent, and aid in the desorption of loosely adsorbed hydrocarbons.

In addition to the above, important economies in heating and cooling are also effected in my process by cooling a freshly regenerated chamber with a stripping gas, suitably of the same composition as the flushing vapors previously discussed, and utilizing the hot stripping gas thereby obtained in the stripping of adsorbed hydrocarbons from a newly flushed chamber, thereby simultaneously cooling one chamber, and utilizing its heat content to supply a major portion of the heat required to desorb adsorbed hydrocarbon from another chamber.

The figure represents diagrammatically one arrangement of apparatus parts in which the process of my invention may be carried out.

Referring now to the drawing, three adsorbent containing chambers may be identified by reference numerals 1, 2 and 3. For purposes of simplicity I will describe a three-vessel assembly, but it is to be understood that a larger number of vessels may be used, for example, four chambers may be used in the process or even five or more, or vessels may be used in units of three or more. However, I will explain herein the process as applied only to a three-vessel operation. As shown in the drawing, each of the vessels 1, 2 and 3, may contain five inlet or outlet connections, one of which is in the bottom of the vessel, one on the lower side and three in the top. The particular placement or location of these connections may well be varied from that just stated depending upon the particular conditions at a particular plant. Reference numeral 4 refers to a heater coil for heating hydrocarbon used in this process. Two fractionators 5 and 6 are fractionators of conventional construction. Fractionator 5 is equipped with connections for an overhead line, a bottom draw-off line, a charge stock inlet line and a reflux addition line.

While the length of an on-stream cycle will usually be taken for economic reasons as the length of time necessary for a bed of adsorbent to become saturated with the aromatic hydrocarbon being separated, for example, benzene, I will for convenience describe the operation of my process on the basis of a 6-hour on-stream cycle. Specific operating conditions such as stream volume, concentration of aromatic hydrocarbon in the feed stream, etc., will then be such that the bed of adsorbent will become saturated with aromatic hydrocarbon within this length of time. In actual operation, however, the on-stream time will be the length of time required for a bed of adsorbent to become saturated with the aromatic and this condition will become evident when some aromatic hydrocarbon appears in the stream of treated hydrocarbon. When there are three adsorption vessels and if each operates on a six-hour on-stream cycle, each vessel may then have twelve hours, for example, for complete regeneration. However, the two vessels on regeneration will be at any one time at different stages of regeneration, as, when vessel 1 is on stream, vessel 2 may be starting regeneration and vessel 3 may be completing its regeneration cycle, and likewise when vessel 3 is on-stream vessel 1 may be starting its regeneration and vessel 2 may be completing its regeneration.

I will describe the operation of my process by describing the process steps of vessel 1. Raw charge stock containing hexane and some benzene enters the system from a source, not shown, through a line 11 and passes through an inlet line 13 and enters the bottom portion of vessel 1. This vessel may be charged with such a quantity of adsorbent or activated silica gel as will efficiently remove the aromatic hydrocarbons from the feed stock over, for example, six hour period. Hexane free from benzene leaves the top of this vessel through a line 16 which is manifolded into a product line 12 for passage of benzene-free hexane to a storage tank or directly to further processing, not shown. For a period of six hours the operation of vessel 1 is as just described, that is, it is on-stream. At the end of this six hour period a valve, not shown, in line 13 is closed, and a valve, not shown, in feed line 15 is opened allowing the feed to enter the adsorber 3. Likewise a valve, not shown, in line 16 is closed and a valve, not shown, in line 18 is opened, and vessel 3 is then on its on-stream cycle.

A guard chamber, not shown, in line 12 may be used to recover any benzene passing thru toward end of any on-stream cycle.

In an apparatus of this nature there is a relatively large number of valves and for purposes of simplicity, I have not shown most of these valves, for example, the valves in lines 13, 15, 16 and 18 just mentioned, since their placement and operation are well known by those skilled in the art.

With vessel 1 closed off with respect to lines 13 and 16 and vessel 3 on-stream, butane vapors at about 150° F. from fractionator 5 pass overhead through a line 68 and are conducted through a manifold line 81 and line 82 into the top of vessel 1. These butane vapors are injected into vessel 1 under such a pressure that the vapors condense upon reaching the relatively cool contents of the vessel. The contents of vessel 1 are at about atmospheric temperature since the hydrocarbon charge stock passing through vessel 1 during its six hour on-stream period was at substantially atmospheric temperature. As this butane condenses, residual unadsorbed liquid hexane containing some benzene is flushed through a bottom draw-off line 21 and through a line 24 into a line 28 from which this displaced material flows into the main charge stock line 11. Also, the condensed butane imparts its heat of condensation to the adsorbent. The displaced stock is thus fed into the charge stock to the plant and during this particular flushing period it flows on through line 15 into adsorber vessel 3. When butane begins to leave the vessel 1 through line 21, as may be determined from samples withdrawn from line 21, through a sample draw-off line, not shown, the flushing period may be considered at an end. The material passing through line 21 is directed through a line 31 into an accumulator vessel 32. This operation is continued until adsorbent in the vessel 1 has become heated to about 150° F. or higher, but below such a temperature at which benzene will be desorbed by the butane vapors entering at about 150° F. through the inlet line 82. This mild heating of the adsorbent bed desorbs or removes a considerable proportion of the hexane which was adsorbed by the silica gel. Thus a mixture of butane and hexane flows through lines 21 and 31 into the accumulator drum 32. For purposes of explanation I have assumed that this hexane desorption cycle requires about one hour.

After removal of this liquid hexane, butane vapors are closed off from line 82, and butane vapors at about 500° F. are passed into this vessel through the overhead line 88. Butane at this high temperature desorbs the benzene or other aromaitc hydrocarbon retained by the adsorbent during the on-stream cycle. Benzene or other aromatics and butane then leave the bottom of the vessel through the bottom draw-off line 21 and this mixture is directed from line 21 through a line 61, through a condenser 62, and condensate finally enters a surge drum 63. Due to a considerable amount of butane vapors at 500° F. being required to heat the adsorbent in vessel 1 from about 150° F. to about 500° F., this desorption step is the longest of any of the regeneration steps. When the major portion of the benzene has been desorbed from the adsorbent the temperature gradient through the chamber will show an abrupt drop from nearly 500° at a point somewhat above the bottom of the chamber to about 150° or so at the bottom end of the chamber. Upon further passage of the hot butane the temperature at the bottom or outlet end of the chamber will start to rise rapidly and when this outlet temperature reaches about 200 to 250° F. I then stop the flow of hot butane vapors from pipe 88 and I open pipe 82 to the flow of butane vapors at about 150° F. At the same time, I close off the flow of materials leaving the chamber which enter line 61 and I open a valve, not shown, in line 29 to permit material to flow through this line and through a line 55 into the heater 4. During this portion of the cycle, butane at the 150° F. temperature, upon entering the vessel 1, becomes heated to about 500° F. and at the outlet end of the vessel this hot butane vapor completes the desorption of the aromatics from the adsorbent. The amount of aromatics so desorbed is small as compared to the amount of aromatics which was desorbed by the 500° butane vapors and carried through line 61 into the surge tank 63. In addition to completing the desorption of the aromatic hydrocarbon from the adsorbent this 150° F. butane also serves to cool the entire body of adsorbent in vessel 1 from 500° to about 150° F. At the end of this cooling period, butane is closed off from pipe 82, and a valve, not shown, in pipe 21 is closed and vessel 1 is then ready to go on-stream again. This entire regeneration portion of the cycle has consumed about twelve hours, which, as mentioned before, is double the on-stream period.

The operations of vessel 2 and of vessel 3 are exactly like the described operation of vessel 1. Vessel 3 may be six hours behind vessel 1 and vessel 2 may be six hours behind vessel 3, and, of course, vessel 1 is then likewise six hours behind vessel 2.

As mentioned hereinbefore, one of the points of utility of the process of my invention is that I make use of the heat retained in the adsorbent bed following the aromatic desorption step. In using this heat I pass butane at about 150° F. through the adsorbent bed at about 500° F. and withdraw butane through line 21 from vessel 1 at about 500° F. This hot butane passes through lines 29 and 55 into the heater 4. In heater 4 the temperature of the butane vapors is brought up to 500° or slightly over, or to whatever temperature is desired for the aromatic desorption step. The heated vapors from heater 4 then pass through line 85 and are conducted through line 86 into the adsorbent bed of vessel 3, which bed is on the aromatic desorption step of the cycle. From the bottom of the vessel 3 a mixture of benzene and butane leaves by way of the bottom draw-off line 23 and this mixture passes through pipes 27 and 61, condenser 62, and into the surge tank 63. Fractionator 5 then operates to separate butane and benzene, the benzene, of course, passing out through the bottoms drawoff line 75 and the butane passing overhead through line 68. The butane from this overhead line 68 at about 150° F. passes through the manifold line 81 and through inlet line 82 into vessel 1 and it leaves vessel 1 through line 21 and flows through lines 29 and 55 into the heater to complete the butane flow cycle. Thus, in summing up this butane flow cycle, butane vapors at 150° F. pass through vessel 1 and are heated therein and are further heated in heater 4, if necessary, to about 500° and this hot butane then passes through vessel 3 to desorb benzene and the mixture of butane, benzene and some hexane leaves vessel 3 through pipe 23 and it flows through pipes 27 and 61 and through condenser 62 into the surge tank 63. In this operation the heat removed from the adsorbent in vessel 1 is used to heat, in part, butane vapors used to desorb the benzene from the adsorbent in vessel 3. In a similar manner when vessel 3 is being cooled by butane vapors at 150° the butane vapors preheated in vessel 3 may be further heated in heater 4 and the hot vapors then go through the adsorbent in vessel 2 to desorb aromatics and the butane-aromatic mixture leaves vessel 2 through line 22 and passes through lines 26 and 61, through condenser 62 and drops into the surge tank 63. And in a similar manner when vessel 2 is on the cooling cycle, butane vapors from line 83 are partly heated in vessel 2, and the heating is completed in the heater 4, and the hot vapors pass to vessel 1 to desorb the aromatics, and the butane-aromatic mixture passes through line 61, condenser 62, and enters the surge tank 63. The fractionator vessel 5 may be operated at a pressure of about 100 to 105 pounds per square inch, or at sufficient pressure that the overhead butane passes through lines 68 and 81 and enters the respective vessels 1, 2 or 3 at a pressure of about 95 pounds per square inch.

A sufficient amount of butane for refluxing the fractionator 5 is bypassed from line 81 through a line 69, condenser 70 into a reflux accumulator 71. Reflux liquid is pumped through a pipe 72 by a pump 73 and through pipe 74 to the top tray of the column. A steam coil 67 provides reboil heat.

The feed to this fractionator is composed mainly of butane and benzene, but contains some hexane, and is fed from the accumulator 63 through a line 64 to a pump 65 and through a feed line 56 into a mid-point of the fractionator. Any make-up butane needed in this portion of the system may be added to the surge tank 63 through a line 60.

The operation of the fractionator 6 is more or less similar to the operation of fractionator 5. Feed stock to this fractionator consists of butane and hexane accumulated in surge vessel 32. This feed stock passes through a line 33 and under influence of a pump 34 passes on through a feed line 35 into about a mid-point of the fractionator 6. A steam coil 37 provides reboil heat to the base of the column. Overhead butane vapors from this column pass through a line 41 into a line 83 or line 55 or both, as necessitated for use in flushing or desorbing operations in vessels 1, 2 or 3. Only sufficient butane for refluxing this column 6 passes through a line 44 and is transferred by a pump 45 through a line 47 to the top tray of the fractionator 6.

Mixtures of butane and hexane from the respective adsorbent containing vessels flow through line 31 into the surge vessel 32 only during the flushing following the on-stream periods.

Fractionator 6 may be a relatively small column and maintained in operation at all times or it may be a larger column and maintained in operation during such intervals of time as required to fractionate the butane-hexane accumulating in vessel 32. This fractionator may then "loaf" for such periods of time as it is not in active operation.

Heater 4 need not be in active operation at all times, but only during such periods of time as butane vapors at 500° F. are needed for desorbing operations in vessels 1, 2 and 3. The remainder of the time the heater 4 may "loaf" or "standby" while awaiting its next active period of operation.

Any make-up butane needed in this portion (fractionator 6) of the apparatus may be added to the accumulator tank 43 through a butane make-up line 51. Hexane bottoms from the fractionator 6 leave this fractionator through a bottoms draw-off line 39. The removal of the hexane through this line may be controlled by a liquid level controller apparatus 38 which controls the flow of the hexane through line 39 in accordance with the level of the hexane in the kettle section of fractionator 6. In a similar manner benzene is withdrawn from the kettle section of fractionator 5 through the bottoms draw-off line 75 and the rate of benzene removal may be controlled by a liquid level controller assembly 40. The motor valve of this assembly in line 75 operates in response to the level of the benzene in the kettle section of this fractionator.

Butane vapors may be passed from line 41 through line 93 into manifold line 81 or from manifold line 81 through lines 93 and 41 into pipe 55 only for such periods of time as necessary for balanced operation of the process.

*Example*

In the system shown in the drawing, 3,330 gallons per hour of a hexane feed containing 3 volume per cent benzene is passed to chamber 1, which contains 87,500 pounds of adsorbent silica gel. After about 6 hours, the silica gel is substantially saturated with benzene. The feed is then switched to chamber 3. Butane at 150° F. and 95 p. s. i. is passed downward through chamber 1 and forces out about 7300 gallons of mechanically held hexane-benzene mixture, which is passed to chamber 3. The butane condenses on the silica gel, imparting heat of condensation to the gel. A total of 3200 gallons of butane at 150° F. is passed through the chamber during this cycle, and 1.7 million B. t. u. is stored in the gel. From chamber 1, 5200 gallons of butane-hexane mixture is withdrawn and passed to fractionator 6 for hexane recovery.

Butane at 500° F. is then passed from heater 4 through chamber 1 to desorb the benzene, about 16.7 million B. t. u. is required for the desorption. The benzene-butane effluent is passed to fractionator 5 for recovery of a 30 per cent benzene concentrate as kettle product. This concentrate amounts to 333 gallons per hour and is the main product of the process.

Passage of 500° F. butane is stopped shortly before all the benzene in chamber 1 has been desorbed at a time when the temperature begins to rise sharply, as previously explained. By switching the flow to heater 4 when the temperature begins to rise sharply, the required heat exchange capacity of condenser 62 is much less than if the butane stream temperature were allowed to rise to 500° F. since in my process the feed to this condenser has a temperature not substantially above 200–250° F. The remaining small amount of benzene is on the silica gel in the bottom of the chamber.

Butane at 150° F. is then passed through the chamber to cool the silica gel. On account of the extremely rapid heat transfer in the chamber, the butane is rapidly heated to substantially adsorbent temperature, and finishes desorbing the benzene from the bottom section of the chamber, while cooling the top section. The effluent is passed through heater 4 to chamber 3 for desorption of benzene. The hot butane effluent from the cooling of chamber 1 contains some benzene, but this benzene is not lost, since it remains in the system and is recovered after passage through chamber 3. This mode of cooling conserves about 6.7 million B. t. u., previously stored in chamber 1, and makes it available for benzene desorption in chamber 3. About 10,000 gallons of butane at 150° F. are required to cool the silica gel in chamber 1 to a temperature suitable for reuse in the adsorption cycle. Most of the butane used in the system is recovered from fractionators 5 and 6 and is recycled.

The invention effects the following economy features:

1. Heat of condensation of butane is made available for desorption.
2. Heat imparted to the adsorbent during desorption is conserved for further desorption.
3. Required heat exchange capacity is minimized.

Pumps, valves, flow controllers, temperature measuring and recording devices and controllers and similar auxiliary but necessary equipment have not been shown in the drawing nor discussed in detail herein for purposes of simplicity. The installation and operation of such auxiliary equipment is well understood by those skilled in the art.

Other adsorbents than silica gel may be used; they must, however, be suitable for preferential adsorption of aromatic hydrocarbons, and permit removal of paraffinic and aromatic "at reasonable temperatures."

While it is preferred to use normal butane vapors for the flushing and desorbing steps as herein disclosed other hydrocarbons such as propane, isobutane, pentane or isopentane can be used. However, it will be understood by those skilled in the art that other pressures and temperatures will need to be used when any of the above mentioned hydrocarbons are used in place of butane.

Other conditions of operation, operational cycle times, etc., may be selected or determined according to given needs as will be understood by those familiar with this art after reading this specification.

Having disclosed my invention, I claim:

1. A continuous process for the extraction and recovery of aromatic hydrocarbon from a narrow boiling range stream of aromatic and paraffinic hydrocarbons wherein said stream of hydrocarbons is passed successively through each of three beds of adsorption silica gel comprising passing said stream of hydrocarbons through the first of the three beds of absorbent; passing a stream of vaporous butane into said first bed of adsorbent and condensing said butane therein to liberate heat of condensation, removing from said first bed the unadsorbed portion of the stream of hydrocarbons remaining in said first bed, and subsequently removing therefrom a mixture of liquid butane and paraffinic hydrocarbons; passing into said first bed a stream of vaporous butane at a temperature of from 400° to 600° F. and removing from said first bed a mixture of aromatic hydrocarbon and butane, recovering from this latter mixture the aromatic hydrocarbon as one product of the process, and vaporous butane; passing vaporous butane at 150° F. into said first bed from which aromatic hydrocarbon has been desorbed at 400° to 600° F. to cool said first bed of gel and to heat the vaporous butane; and after the cooling of said first bed passing thereinto said stream of aromatic and paraffinic hydrocarbons to complete the cycle.

2. A continuous process for the extraction and recovery of aromatic hydrocarbon from a narrow boiling range stream of aromatic and paraffinic hydrocarbons wherein said stream of hydrocarbons is passed successively through each of three beds of adsorbent silica gel comprising passing said stream of hydrocarbons through the first of said beds of adsorbent, then passing said stream of hydrocarbons to the third bed, passing a stream of vaporous butane into said first bed and condensing said butane therein to liberate heat of condensation, removing from said first bed the unadsorbed portion of the stream of hydrocarbons and passing the removed portion of said hydrocarbons into said third bed, and further passing said stream of vaporous butane into said first bed and condensing this vaporous butane therein to liberate heat of condensation, removing from said first bed a mixture of liquid butane and paraffinic hydrocarbons, passing into said first bed a stream of vaporous butane at a temperature of from 400° to 600° F. and removing therefrom a mixture of aromatic hydrocarbon and butane, recovering from this latter mixture the aromatic hydrocarbon as one product of the process, and vaporous butane, passing this vaporous butane at 150° F. into the second bed from which aromatic hydrocarbon has been desorbed at 400° to 600° F. to cool said second bed, passing vaporous butane at 150° F. into said first bed from which aromatic hydrocarbon has been desorbed at 400° to 600° F. to cool said first bed and to heat the vaporous butane, further heating this latter vaporous butane to a temperature of 400° to 600° F. and at this temperature passing this further heated butane into said third bed, and after the cooling of said first bed passing thereinto said stream of aromatic and paraffinic hydrocarbons to complete the cycle.

3. The process of claim 2 in which the aromatic hydrocarbon is benzene and the paraffinic hydrocarbon is hexane.

HAROLD J. HEPP.

REFERENCES CITED

The following references are of record in the file of this patent:

UNITED STATES PATENTS

| Number | Name | Date |
| --- | --- | --- |
| 2,395,491 | Mavity | Feb. 26, 1946 |
| 2,441,572 | Hirschler | May 18, 1948 |
| 2,448,489 | Hirschler | Aug. 31, 1948 |
| 2,464,311 | Hiatt et al. | Mar. 15, 1949 |